United States Patent [19]
Bockwoldt

[11] 3,947,826
[45] Mar. 30, 1976

[54] SCAN CONVERTOR

[75] Inventor: Walter H. Bockwoldt, Woodland Hills, Calif.

[73] Assignee: Hughes Aircraft Company, Culver City, Calif.

[22] Filed: Dec. 3, 1973

[21] Appl. No.: 421,880

[52] U.S. Cl. .......................... 340/173 R; 340/172.5
[51] Int. Cl.² ........................................ G11C 13/00
[58] Field of Search .. 340/173 R, 173 AM, 173 RC, 340/172.5

[56] References Cited
UNITED STATES PATENTS
3,733,589   5/1973   Thompson ................... 340/173 AM
3,772,658   11/1973  Sarlo .............................. 340/173 R Primary Examiner—Terrell W. Fears
Attorney, Agent, or Firm—W. H. MacAllister; Lawrence V. Link, Jr.

[57] ABSTRACT

The disclosed invention provides the method and apparatus for transforming data, such as low time base parallel channel data produced by thermal imaging type systems, for example, into a second format such as high time base single channel data of the type required by standard television monitors. In accordance with the invention means are provided for storing the applied parallel channel data a set at a time in preselected ones of a plurality of memory devices and for reading out each of the lines of data of the set stored during the last preceding period a preselected number of times at a predetermined time base. Hence, the number of data lines per field and/or the time base of the output data, may be in accordance with selected parameters.

12 Claims, 20 Drawing Figures

Fig 2

| Scanner Video Channels | | Scanner Line Format | | Scan Converted TV Line Format | |
|---|---|---|---|---|---|
| Orientation | Line Steps | Field 1 (120 Active Lines) | Field 2 (120 Active Lines) | Field 1 (240 Active Lines) | Field 2 (240 Active Lines) |
| Detector 10A  Detector 10B | ←2→ ←2→ ←2→ | A₁  B₁  A₃  B₃  A₅  B₅ | A₂  B₂  A₄  B₄  A₆  B₆ | A₁  B₁  A₃  B₃  A₅  B₅ | A₂  B₂  A₄  B₄  A₆  B₆ |

$$CP_A = C_L \cdot A + C_R \cdot \overline{B}$$
$$CP_B = C_L \cdot \overline{A} + C_R \cdot B$$

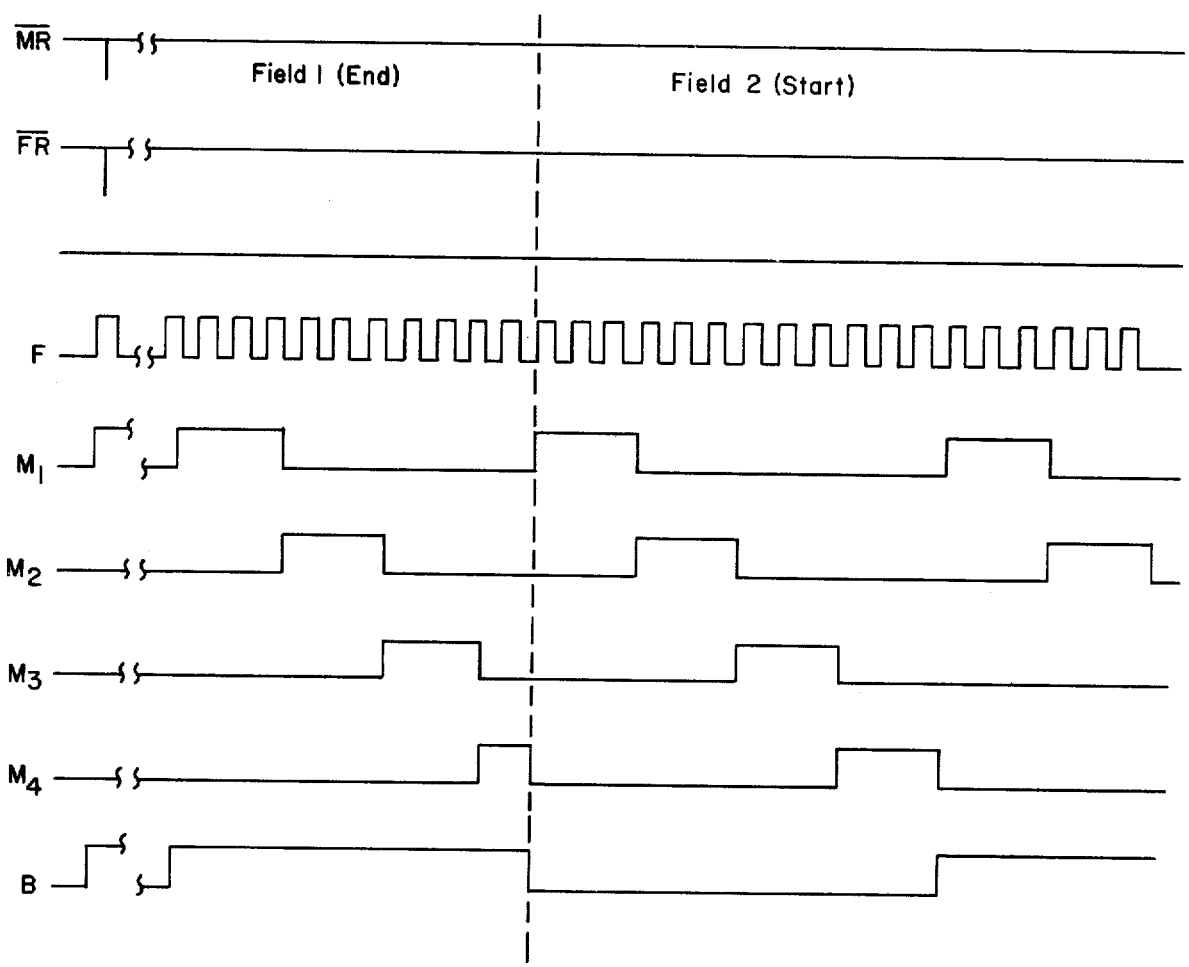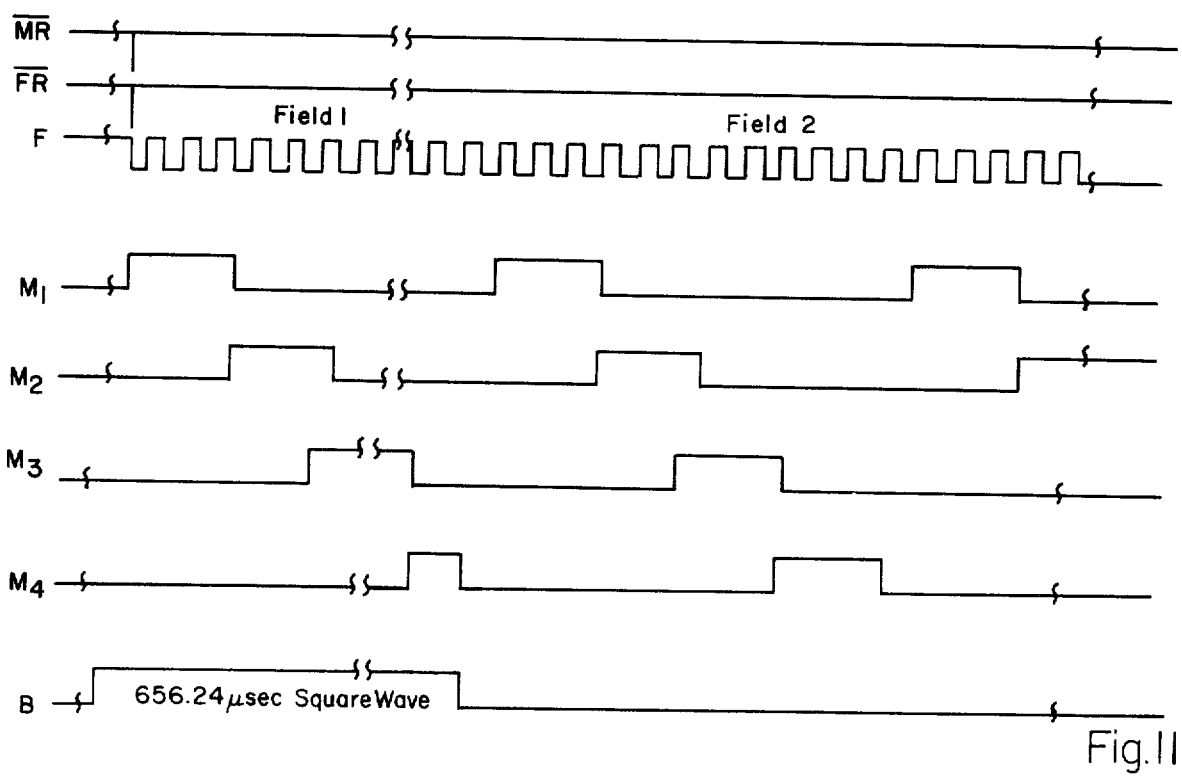
Fig.11

SCAN CONVERTOR

The invention claimed herein was made in the course of or under a contract with the United States Navy.

BACKGROUND OF THE INVENTION

The subject invention relates to scan convertors in general and is particularly useful for changing the format of low time base parallel channel imaging type data into single channel high time base data of a TV format.

The best known prior art scan convertors usually require the storage of at least two fields of the applied data so that the current field of data may be received and stored as the previous one is scan converted. When digital techniques are used to implement this prior art method a very large memory capacity is required for the storage of two fields of data and the scan convertor cost is high. Analog implementations of the prior art field by field scan conversion techniques have been mechanized or suggested whereby combinations of light emitting diodes, vidicons, cathode ray tubes or other non-solid state devices have been utilized. In addition to the relatively high cost of the just listed analog devices, the non-solid state character thereof has caused problems with equipment reliability. Also the prior art scan conversion technique, whereby an entire field of data must be stored before scan converting, imposes a substantial time delay between the application of the data and the corresponding output signal. Such time delay is undesirable in many applications, such as tracker systems for missiles, for example.

SUMMARY OF THE INVENTION

A primary object of the subject invention is to provide a new and improved method and apparatus for transforming the format of imaging type data.

Another object of the invention is to provide a new and improved scan convertor for transforming multiple parallel lines or channels of input data into single channel data.

A further object of the invention is to provide the method and apparatus for scan converting imaging type data which allows an increase in equipment reliability and a decrease in processing time delay.

A still further object of the invention is to provide a new and improved scan convertor for transforming multiple parallel lines or channels of input data having a first time base to single channel data having a different time base, by means readily adaptable to implementation with reliable solid state circuitry.

The subject invention provides for transforming first data groups, each comprising sets of lines of parallel channel data having a first time base, into second data groups each comprising lines of data having a preselected time base and number of channels by means of a novel line-by-line conversion technique which drastically reduces the amount of storage required by prior art field-by-field or frame-by-frame techniques. The invention is adapted to a wide range of implementations including digital implementations in which digital shift registers are used to store at least two sets of lines of the parallel channel input data such that a first memory section is loaded with data while a second memory section is read out. During readout each line of the stored data is reproduced a predetermined number of times at a predetermined time base.

In accordance with a second embodiment of the invention an even greater reduction in equipment complexity is obtained by the utilization of charge-coupled semiconductor devices to form the memory sections so that the requirement for analog-to-digital conversion of the data prior to storage and the requirement for digital-to-analog conversion in the output stage of the scan convertor is eliminated.

In a third embodiment of the invention provisions are made for the storage of a fractional line of input data per storage register whereby the required storage capacity of the scan convertor is less than in other embodiments. The fractional line storage feature is of particular importance in embodiments using charge-coupled devices for information storage inasmuch as the yield of such devices in large scale integration configurations is increased as the storage capacity requirement per register is decreased. Also by reducing the number of times a given sample of data must be transferred (shorter register lengths) the fractional line storage feature allows the use of charge-coupled devices having a lower "transfer efficiency" and/or improves the processing signal-to-noise ratio.

BRIEF DESCRIPTION OF THE DRAWINGS

The novel features of this invention, as well as the invention itself, will better understood from the accompanying description taken in connection with the accompanying drawings in which like reference characters refer to like parts and in which:

FIG. 2 is a diagram which depicts the video line format of input data, and to output data from the scan convertor shown in FIG. 1;

FIG. 8 through 13 depicts waveforms of timing and control signals which are useful in understanding the operation of the scan converter of FIG. 4;

DESCRIPTION OF THE PREFERRED EMBODIMENT

Figure 1:
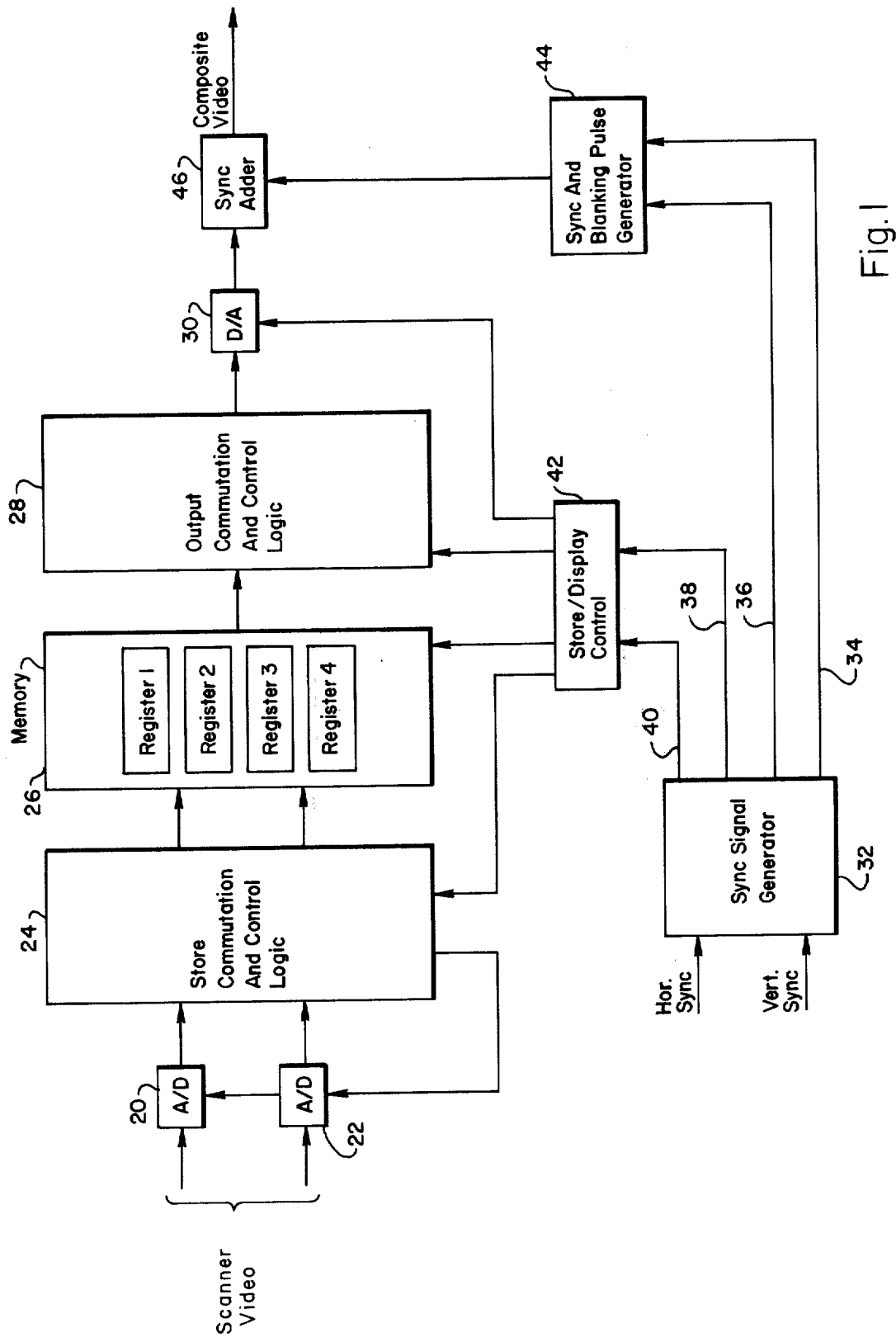
FIG. 1 is a block diagram of a scan convertor in accordance with the subject invention.

Reference is first directed to FIG. 1 which shows in block diagram from an embodiment of the subject invention which is particularly adapted to transforming parallel channel video signals, such as produced by an infrared image scanner, into single channel video of the type suited for display by a standard television monitor. It is noted that the subject invention is not limited to infrared scanner applications but is directly applicable to most scan convertor applications, such as bandwidth reduction television systems, for example.

An infrared scanner of the type which generates the input data described above is disclosed in detail in patent application Ser. No. 346,523 filed Mar. 26, 1973. In the just referenced application the scanner provides four parallel channels of data; however, a dual channel system is first described herein so that the basic structural and operational aspects of the invention may be more clearly described. Subsequently a four parallel channel scan convertor implementation of the invention will be described with respect to the more detailed embodiment of FIG. 4.

The format of the data applied to the system of FIG. 1 may be better understood by referring momentarily to FIG. 2. It is assumed in the exemplary embodiment of FIG. 1 that the applied video is produced by two infrared detectors 10A and 10B, and that these detectors are optically scanned by means of an infrared (IR) scanner (of the general type described in the above cited patent application) which has 60 active scanning facets each of which is adapted for scanning a different horizontal line (per detector) of a field of view. Hence, the scanner will produce 60 lines of IR video from each of the detectors (10A and 10B) during each scanning field. The output lines from each of the detectors during the first field are identified by an odd integer subscript (e.g. $A_1$, $A_3$, $A_5$, and $B_1$, $B_3$, $B_5$) and the data resulting from the second field by even integer subscripts. As the first mirror facet of the scanner optically scans the detector array the video output signal line $A_1$ is produced by detector 10A and the video output line $B_1$ is simultaneously produced by detector 10B. The operation continues in a similar manner until the last active scan has been completed of the scanning field; and then the first mirror facet optically scans the pair of detectors for the first scanning period of the second field to produce the output data lines $A_2$ and $B_2$ from detectors 10A and 10B respectively. For the selected example there are 60 mirror facets and therefore 120 active output data lines per field from the scanner i.e. 60 lines per detector.

As noted above, the exemplary purposes of the embodiment of FIG. 1 is to convert the just described data provided by the scanner into a format that is compatible to standard television monitor devices. One scanner line period is approximately equal to 254 microseconds (comprising two scan lines — outputs from detectors 10A and 10B). The time period of one standard television line period is approximately 63.5 microseconds. As shown in the two right-hand columns of FIG. 2, each horizontal scan line is converted into two identical lines of output television video while maintaining precise synchronization between the IR scanning format and the output television line format. It is noted that the integer relationship between the seeker and TV horizontal line periods is not a generalized requirement for operation of the subject invention; and the integer relationship between the scanner line rate and the output video line rate was herein selected in the interest of clarity of explanation.

Referring again primarily to FIG. 1, the output video from detectors 10A and 10B (see FIG. 2) is applied to analog to digital (A/D) convertors 20 and 22 respectively and their output signals are applied to a store commutation and control logic unit 24. The unit 24 controls the application of the output signals from convertors 20 and 22 to a digital memory device 26. The digital memory device 26 is read out in response to an output commutation and control logic unit 28 through a digital to analog convertor 30.

Horizontal and vertical synchronization (sync) pulses from the scanner (not shown) are applied to a sync signal generator 32 which in response thereto provides vertical and horizontal television (TV) sync pulses, output TV sample rate signals and scanner sample rate signals on output leads 34, 36, 38 and 40, respectively. The scanner sample rate signals and the television sample rate signals are applied to a store/display control unit 42 which in response thereto provides control and timing signals for units 24, 26, and 28 as well as timing signals to digital-to-analog (D/A) convertor 30.

Sync and blanking pulse generator 44 responds to horizontal and vertical sync pulses which are applied on leads 34 and 36 to produce a composite sync and blanking pulse train which is combined with the output video from digital-to-analog convertor 30 within a sync adder 46 to produce composite output video (see FIG. 16) which is suitable for being displayed by a conventional television monitor.

Figure 3:
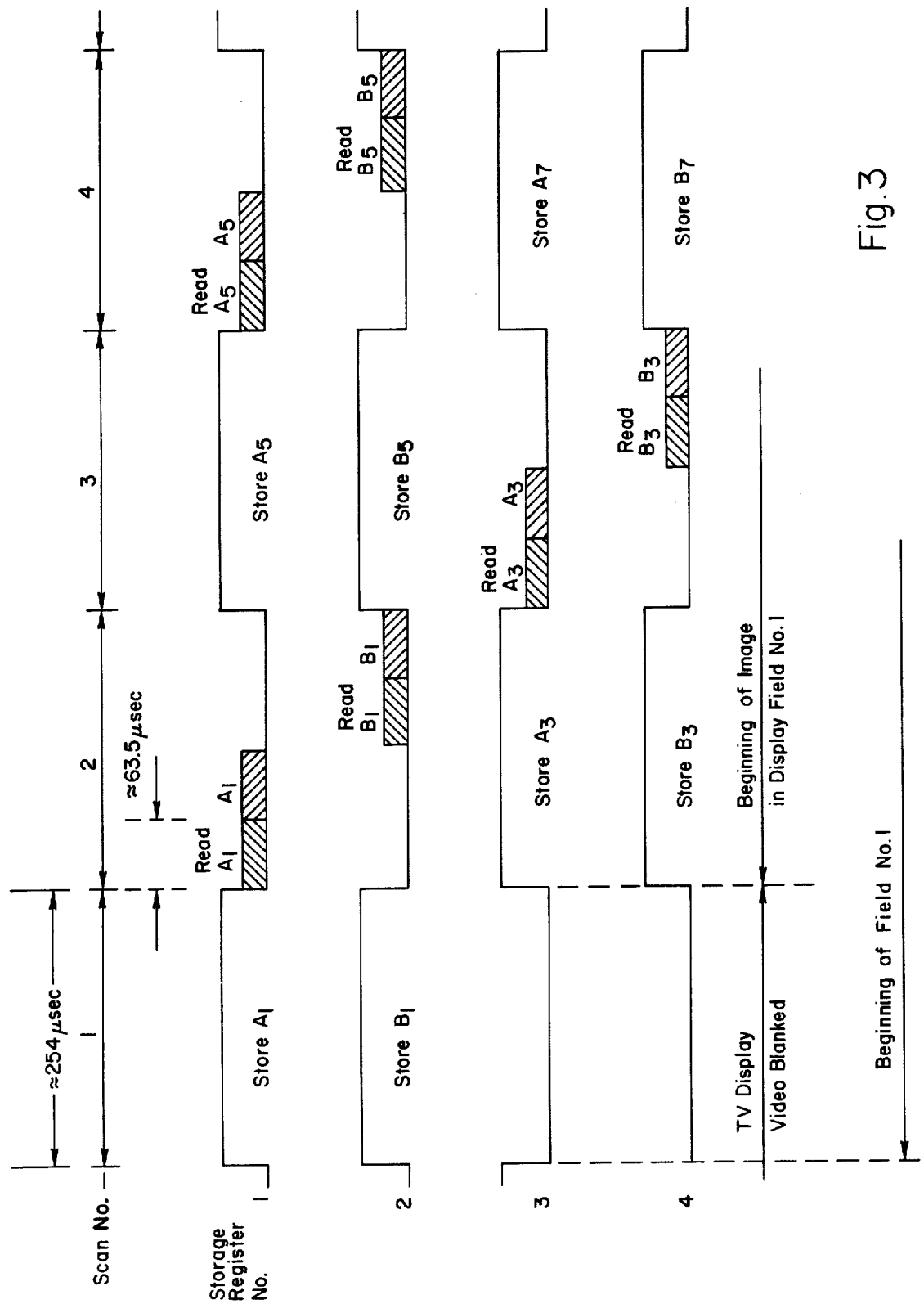
FIG. 3 is a timing diagram for the scan convertor shown in FIG. 1.

The operation of the system of FIG. 1 may be better understood with reference to FIGS. 2 and 3; and as there indicated during the first horizontal scan period of the scanner video scan lines $A_1$ and $B_1$ are stored in parallel in registers number 1 and number 2, respectively, of digital memory 26. The analog-to-digital conversion and the rate of storage of data into memory 26 is controlled in response to the scanner sample rate signal. During the second horizontal scan period data lines $A_3$ and $B_3$ are stored in parallel in registers number 3 and 4, respectively, of memory unit 26. During this same time period register number 1 is read out in accordance with the format indicated in FIG. 3, with the first line of data ($A_1$) being read out of register number 1 in the television time base, i.e. 63.5 microseconds and then the same line is read out a second time. The register recycles data to provide more than one readout. Similarly, the data $B_1$ is read out twice from storage register number 2. During the third time period scanner data lines $A_5$ and $B_5$ are stored in parallel in registers number 1 and 2 and the data previously stored therein (lines $A_1$ and $B_1$) is simultaneously discarded. During the third time period scanner line $A_3$ is read out twice at the television time base, as is line $B_3$. The just described sequence of reading data into the memory device 26 at the scanner rate and storing one set of data lines while reading out the previously stored set of data lines twice is repeated for the remaining group of data which comprises field number 1. A similar sequence is repeated for data that comprises the scanning field number 2 to produce the scan converted TV line format shown in FIG. 2. It is noted that when the converted data is applied to a standard television monitor that the normal interlace between fields will superimpose the data of the last two columns of FIG. 2 so that data from the two fields will be interleaved. Hence, for a stationary scene, and the scan convertor of FIG. 1, each line of the scene will be converted into four adjacent, identical lines on the display.

Figure 4:
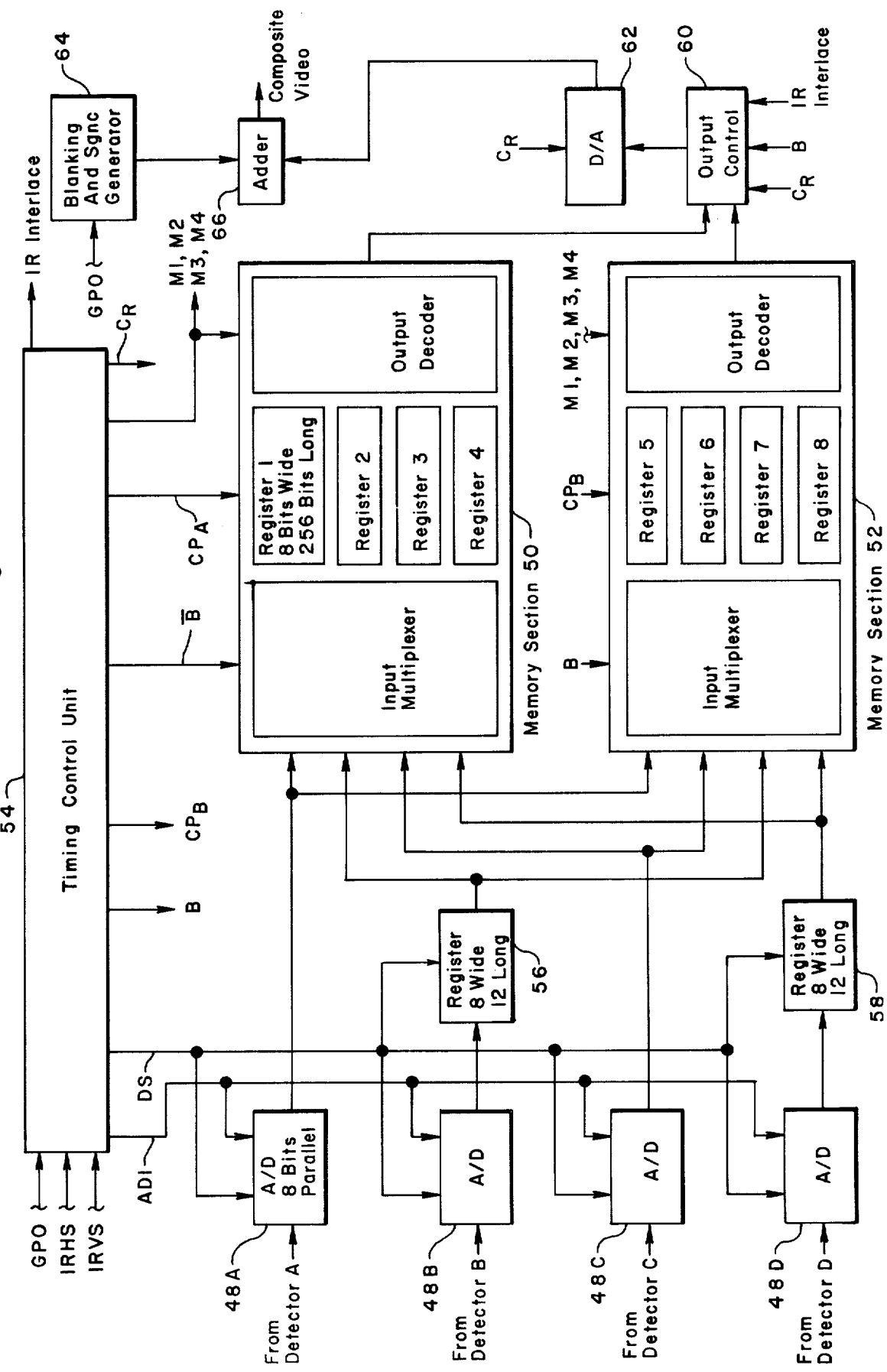
FIG. 4 is a block diagram of a second embodiment of a scan convertor in accordance with the subject invention.

A scan convertor in accordance with the subject invention, which is adapted for processing four parallel channels of applied video data into a single channel of composite TV format video, is shown in FIG. 4. A scanner suitable for providing the four parallel channels of applied input data is described in detail in the patent application cited hereinabove. To briefly summarize that scanner implementation, four detector arrays and an optical system are used in conjunction with a set of rotating mirror facets of a drum scanner to scan an IR image of a scene. The rotating drum scanner has an equivalent of 21⅞ total mirror facets with 20 of these facets being used to generate the image. Since there are four detector arrays, each of which generate an IR scan line from each mirror facet, there are 80 active IR scan lines per field (one revolution of the drum scanner) or 160 active IR scan lines per frame (two rotations of the mirror drum scanner). The IR scan lines from field to field are interlaced by means described in the above cited patent application.

Figure 5:
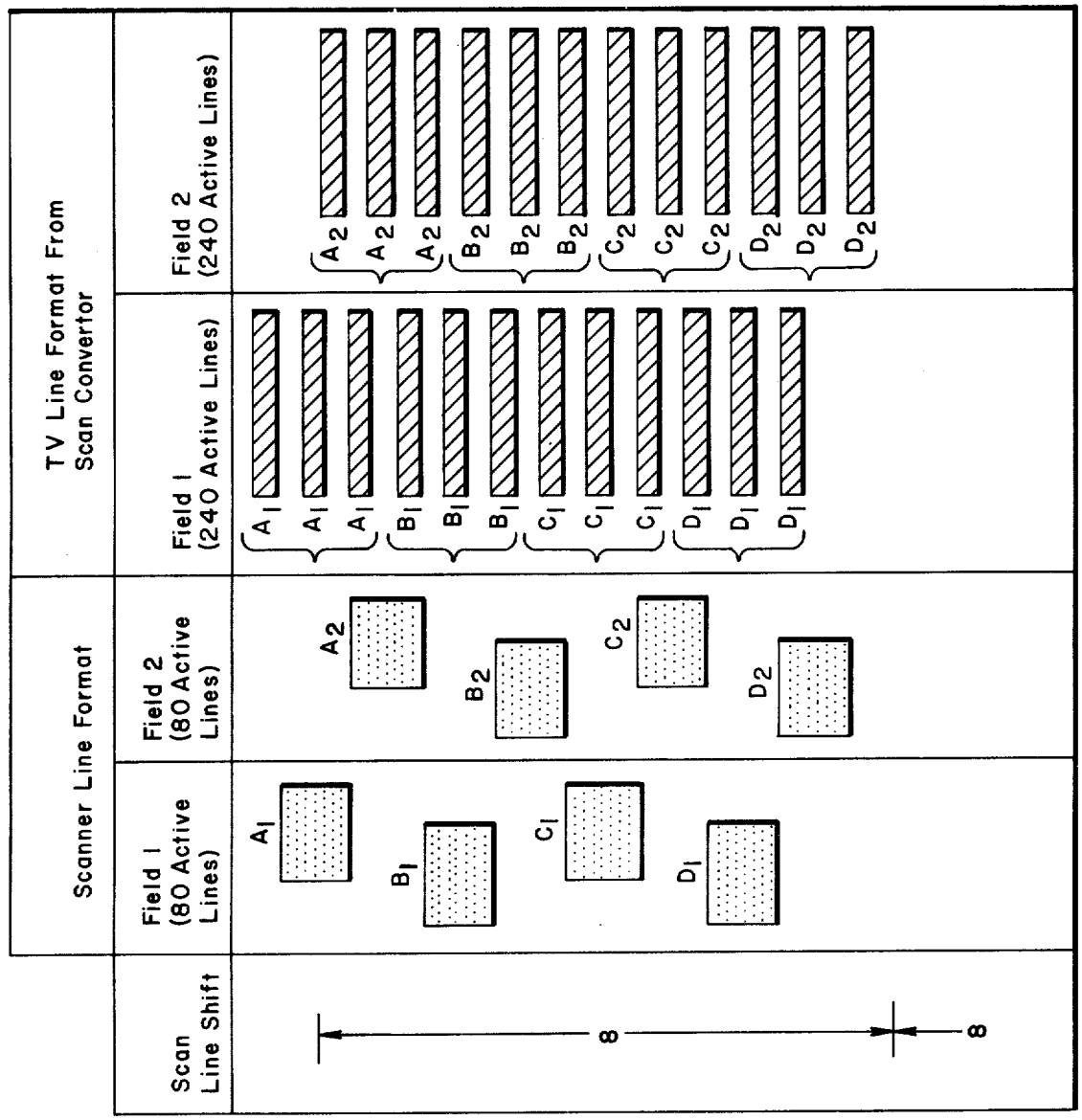
FIG. 5 is a diagram depicting the video line format of input data to, and output data from the scan convertor of FIG. 4.

The adjacent mirror facets of the drum scanner are so inclined with respect to one another that the IR image is shifted by 8 scan lines between mirror facets. The IR lines produced by one mirror facet scan in field 1 (odd numbered) and one mirror facet in field 2 (even numbered) are shown in FIG. 5 for the above described line scan format. In FIG. 5, the letters A, B, C, and D correspond to the data channel (IR detector arrays) and the subscript 1 corresponds to the first horizontal scan period (mirror drum facet) in field 1 and the subscript 2 corresponds to the first horizontal scan period in field 2.

The scan convertor of FIG. 4 transforms the four parallel channels of IR video into a single channel of composite TV video which conforms to the EIA RS-170 specification for television signals. The relative functional placement of the four detectors during the field 1 and 2 as well as the relative placement of the TV line format at the output of the scan convertor are depicted in FIG. 5. It is noted in FIG. 5 that each of the IR scan lines is displayed three times during each TV field; and therefore the image on the TV display will contain 240 active lines per TV field and 480 active lines per TV frame.

In the scanner of the above cited patent application each mirror facet is equivalent to one IR horizontal line period during which there are four parallel IR lines; and each of these four IR lines is transformed into three TV lines. Therefore, each revolution of the drum mirror scanner corresponds to 262.5 TV format lines (12 × 21⅞ mirror facets), which is a standard TV field. However, during the 1⅞ inactive IR scan periods in which the vertical retrace and the interlace actuation occurs, the video information is blanked. Hence, after scan conversion the output signals consist of 240 active lines per field.

It is again noted that in accordance with the subject invention the scan conversion from the seeker line format to the EIA RS-170 TV format is accomplished by using a line-by-line conversion technique rather than a field-by-field or frame-by-frame technique. This important aspect of the subject invention drastically reduces the amount of storage required.

Figure 6:
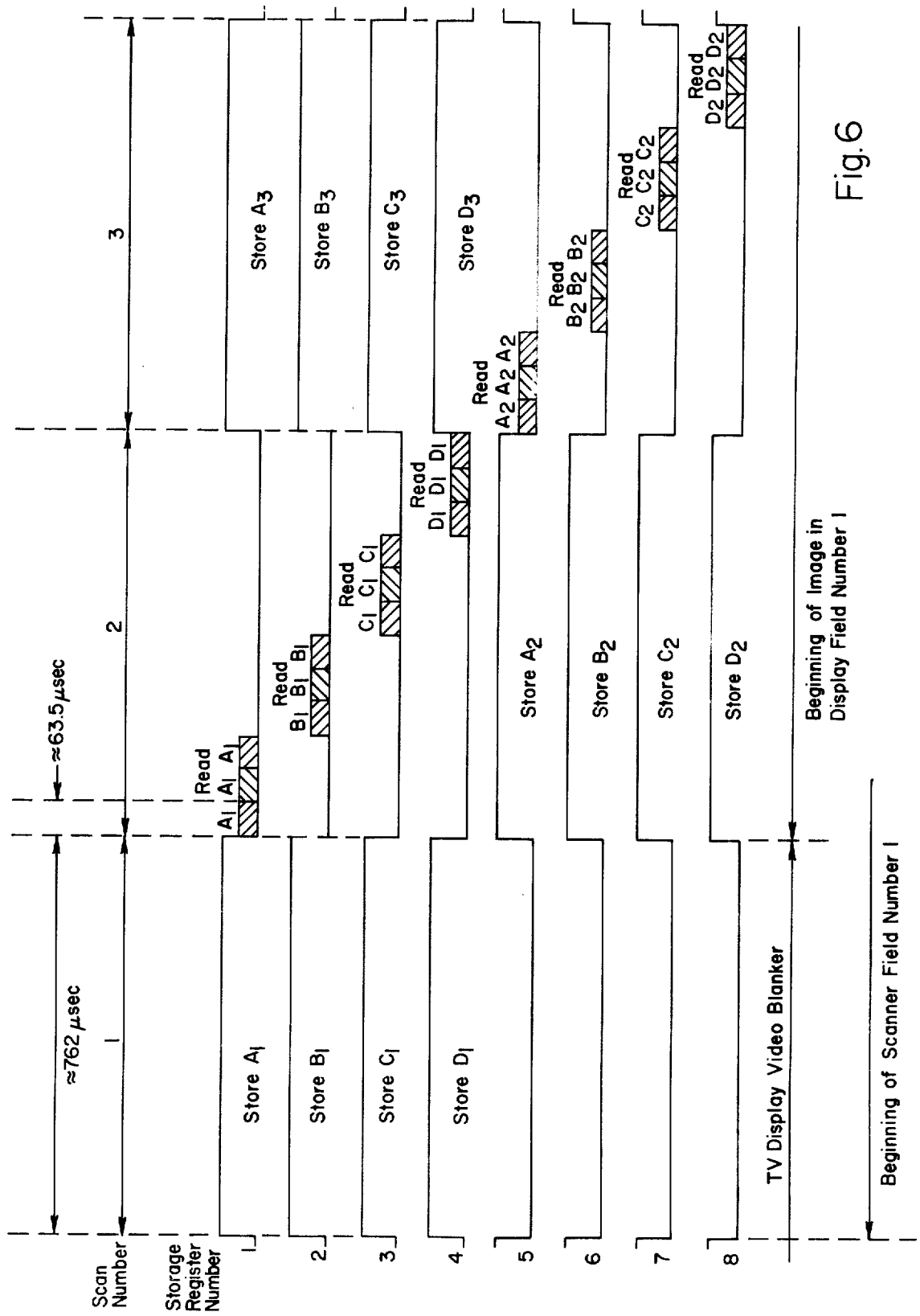
FIG. 6 is a timing diagram for the scan convertor of FIG. 4.

The basic timing, storage and readout operation of scan convertor of FIG. 4 is shown in FIG. 6. By selection of the scanner design parameters the standard TV horizontal scan rate of 15,750 lines per second is exactly 12 times faster than the IR scanner line scan rate. One scanner line period is approximately 762 microseconds (corresponding to four IR scan lines) as compared to 63.5 microseconds for one TV line period. Therefore each IR scan line can be converted into three identical TV lines while maintaining precise synchronization between the scanner line format and the TV line format.

In the embodiment of FIG. 4 the total amount of line-to-line storage required is two IR scan periods; and with four IR lines per scan period, 8 bits per sample word, and 256 sample words per video line, 16,384 bits of storage are required. In the embodiment of FIG. 4, this storage is implemented by two identical memory sections 50 and 52, each of which comprise 8,192 bits of storage. Each memory section comprises four parallel, 8 bits wide, 256 bits long, shift registers; and preferably these registers would be the dynamic metal oxide silicon (MOS) type because of their high density and relatively low cost.

During each IR scan period one memory section (50 or 52) is loaded in parallel with four lines of IR data at the load rate of 393.75 khz while the other memory section is being read out (and recirculated) at a 4.725 Mhz rate. During this readout period each IR data line stored during the previous IR scan period is read out (single channel readout in embodiment of FIG. 4) three times so that for each four IR data lines stored in a memory section, twelve TV output data lines are produced (see FIGS. 5 and 6). It is noted that memory sections 50 and 52 are of the dual (two phase) internally clocked type so that the clocking pulse $CP_A$ and $CP_B$, respectively, are at one-half the data rate. For example, during the data load period of memory section 50, clock pulses $CP_A$ are at a 196.875 khz rate; and during the readout and recirculation period clock pulses $CP_A$ are at a 2.3625 Mhz rate.

At the beginning of each IR scanner field the IR video from the first four scan lines $A_1$, $B_1$, $C_1$ and $D_1$ is stored in registers 1, 2, 3 and 4 of memory section 50 (see FIGS. 4–6). During horizontal scan period two the next four lines $A_3$, $B_3$, $C_3$ and $D_3$ are stored in registers 5, 6, 7 and 8 of memory section 52. Also during horizontal scan period two line $A_1$ is read out of register 1 three times, then line $B_1$ is read out of register 2 three times, next line $C_1$ is read out of register 3 three times and then line $D_1$ is read out of register 4 three times. By commutating the scanner video lines into the eight identical storage registers, the currently produced IR scan lines are read into four of the registers of one memory section while TV video is read from the registers of the other memory section.

Referring now primarily to FIG. 4, the four IR video signals from four detectors are processed and buffered (by circuit not shown) and then are applied as inputs to four (8 bits, parallel) analog-to-digital convertors 48A, 48B, 48C and 48D, respectively, wherein the applied signals are digitized. The analog-to-digital convertors are controlled by data shift (DS) and analog-to-digital initiate (ADI) signals applied from a timing control unit 54. Unit 54 controls the timing of the various operations of the scan convertor and will be described in detail subsequently relative to FIG. 7.

Due to physical restraints with respect to the location of the detector arrays within the scanner (not shown) it is sometimes required that the detectors be staggered (see FIG. 5); and in the embodiment of FIG. 4 means for compensating for this factor are incorporated. In the illustrated embodiment it is assumed that the video from detectors B and D (FIG. 5) leads the video from detectors A and C by 30.5 microseconds and compensation for this time offset is provided by two 8 bits wide, 12 bits long registers 56 and 58. Registers 56 and 58 are clocked by the DS signal which has a time period equal to the IR sample time and a repetition rate of the IR data sampling rate, e.g. 393.75 khz.

The output signals from the analog-to-digital convertors 48A and 48C and the output signals from shift registers 46 and 58 are applied to memory sections 50 and 52. Each of these memory sections comprises input data multiplexers and output data decoder units, four 8 bits by 256 bits shift registers and conventional recirculation circuitry (not shown). The memory sections 50 and 52 are clocked by composite clock signals $CP_A$ and $CP_D$, respectively, which signals are applied from timing control unit 54. The clock pulses are gated so that data is stored in the memory sections from the center 256 bits of each IR scan line. Each IR scan line have a time period equivalent to approximately 300 load clock pulses.

Commutation of the input IR video into memory sections 50 and 52 is controlled by the respective input multiplexer units in response to control signals B and B respectively. The IR video signals are read into one of the memory sections while data from the previously IR horizontal scan period is read from the other memory section in accordance with the format shown in FIGS. 5 and 6. The output decoder units of memory sections 50 and 52 are controlled by signals $M_1$, $M_2$, $M_3$ and $M_4$ produced by timing control unit 54 and applied in parallel on multiple leads (shown as single cable). The output decoder units of the memory sections respond to the signals $M_1$, $M_2$, $M_3$ and $M_4$ so as to determine the count of the 12 cycle output period. For example, during the first three counts register 1 is read out; during the next three counts register 2; during the following three counts registers 3; and during the final three counts of the 12 count period register 4. During an alternate operational cycle the registers 5, 6, 7 and 8 would be read out in a similar manner.

An example of one sequence of operation of the memory sections 50 and 52 would be as follows. In response to the signals B and B during odd numbered IR horizontal scan period the IR data is loaded into memory 50 and during even numbered IR horizontal scan periods into memory section 52. During even numbered scan periods memory section 50 is read out at the television data rate of 4.725 Mhz and the data is recirculated by conventional recirculation circuits (not shown) within the memory section. Similarly, during the odd numbered IR horizontal scan periods when data is being written into memory section 50 data is simultaneously being circulated in and read out of memory section 52. Output control unit 60 responds to the control signal B applied from timing control unit 54 so that the data from the output decoder of memory section 50 is applied to the digital-to-analog convertor 62 during even numbered IR horizontal scan periods; and the output data from the decoder of memory section 52 is coupled through output control unit 60 during odd numbered IR horizontal scan periods. Blanking and sync signals produced by a generator 64 are combined with the output signals from digital-to-analog convertor 62 in an adder 66 to form a composite scan converted video in the standard TV format.

Figure 7:
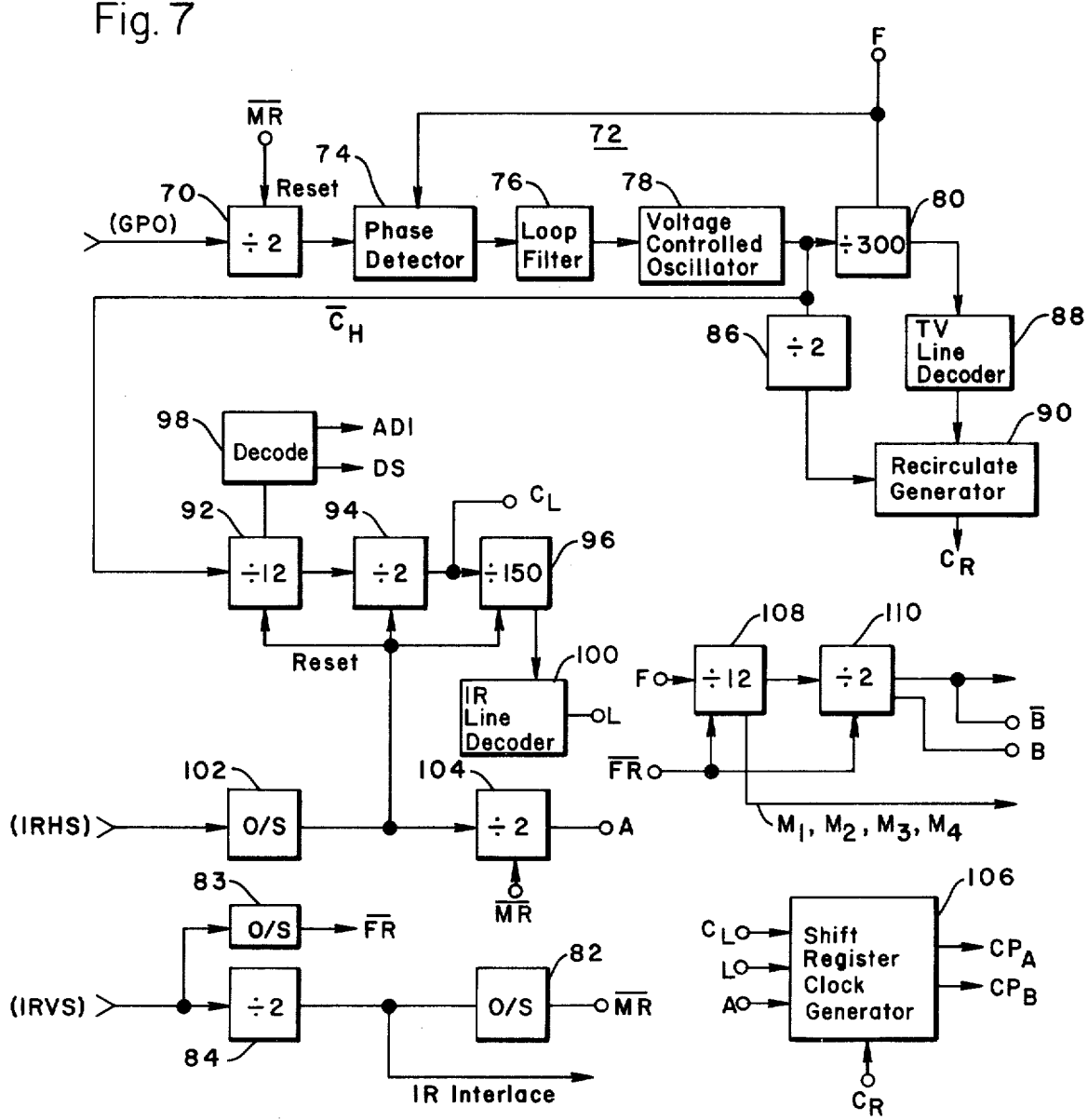
FIG. 7 is a block diagram of the timing control unit shown in FIG. 4.
Figure 8:
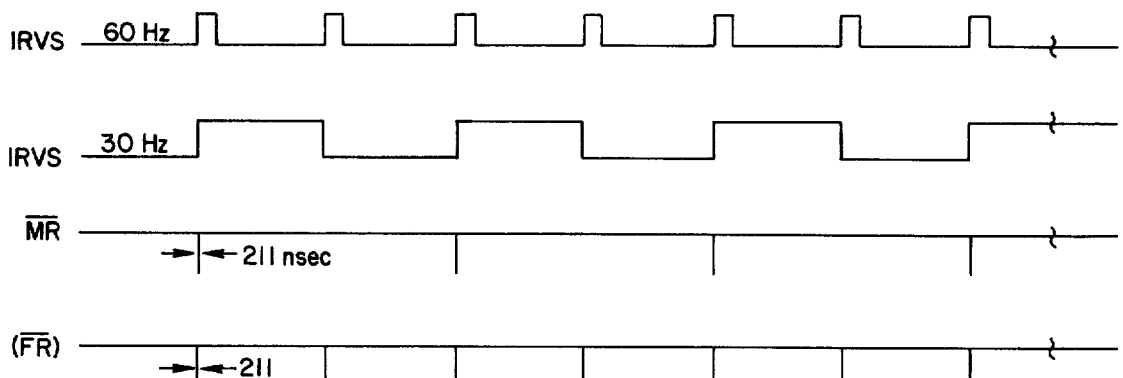
Figure 9:
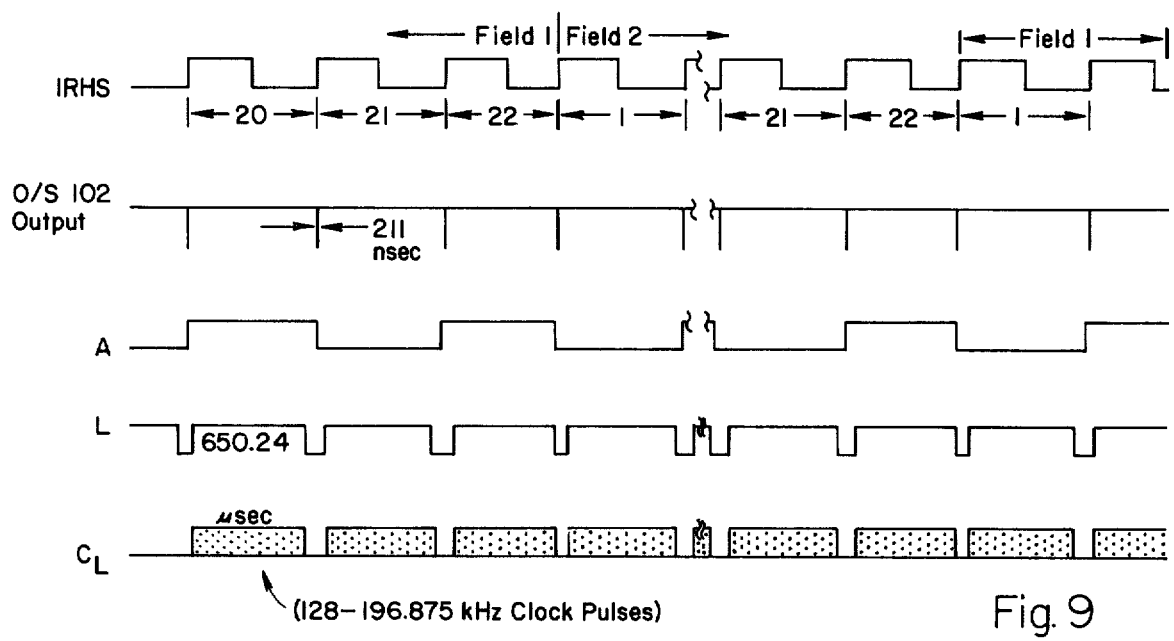

Timing control unit 54 of FIG. 4 is shown in greater detail in FIG. 7 to which reference is now primarily directed. Unit 54 responds to three digital timing signals which are applied thereto from the IR scanner (not shown). These input signals are: the IR vertical sync (IRVS) signal; the IR horizontal sync (IRHS) signal; and the gyro pickoff output (GPO) signal. The IRVS signal occurs at the leading edge of the first mirror facet of the IR mirror drum scanner and is illustrated in FIG. 8. The IRHS signal occurs at the leading edge of each of the mirror facets of the drum scanner and is depicted in FIG. 9. The GPO signal is produced by a reticle (not shown) on the rotor of the mirror drum scanner in conjunction with an optical pickoff and produces a signal at twice the TV horizontal frequency (31.5 khz), see FIG. 10.

As shown in the upper portion of FIG. 7, the GPO signal (31.5 khz) is divided by 2 within a divider 70 and a phase-locked loop 72 locks the phase of a 4.725 Mhz voltage controlled oscillator to the 15.750 khz output signal from divider 70. Phase-locked loop 72 comprises phase detector 74, loop filter 76, voltage control oscillator 78 and a divider 80 arranged in a conventional phase-locked loop configuration.

Divider 70 is reset by master reset (MR) signal produced by a monostable multivibrator or one shot (O/S) 82 which is shown in the lower left-hand portion of FIG. 7. One shot 82 is controlled by the output signal from a divider 84 which counts the IR vertical sync pulses (IRVS) down by 2. The IRVS sync pulses are also applied to a one shot 83 to provide field reset signals (FR). The master reset pulse is generated off the leading edge of the IR interlace sync signal (see FIG. 8) and defines the upper left-hand corner of field 1. The field reset pulse (see FIG. 8) is generated at the beginning of each field.

Figure 10:
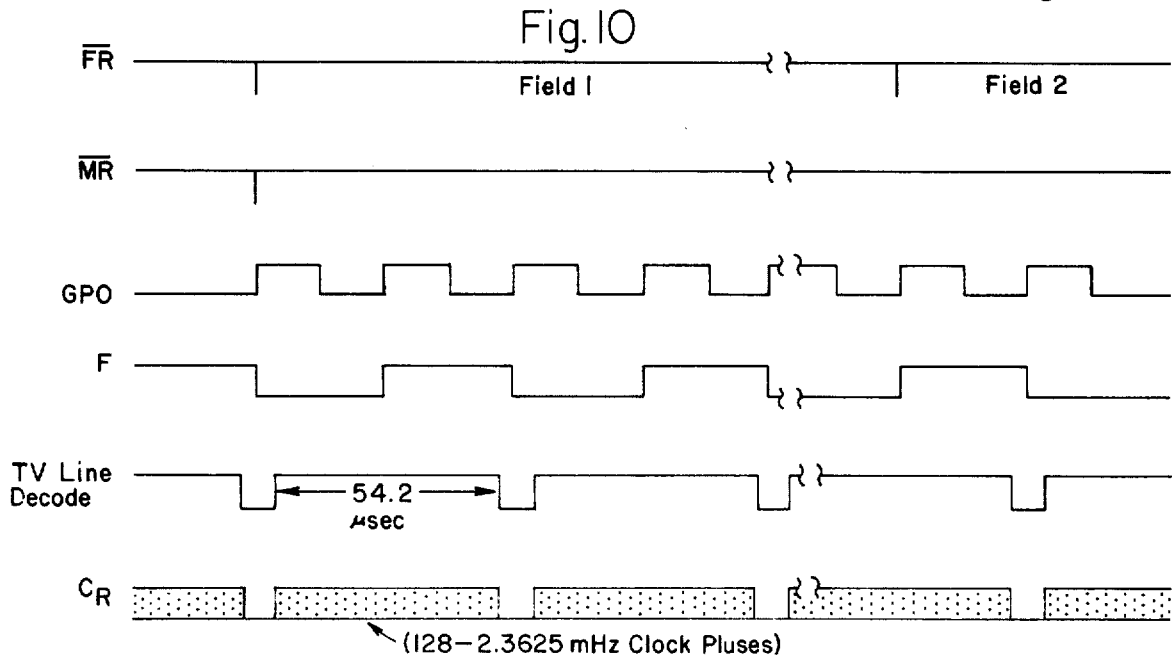

As shown in the upper right-hand portion of FIG. 7, divider unit 86, TV line decoder 88, and recirculate generator 90 are operatively coupled to produce the recirculate clock signal $C_R$. As depicted in FIG. 10, TV line decoder 88 gates the recirculating generator 90 during the center 54.2 microsecond interval of the 15.750 khz F signals; and during the TV line decoder gate interval 2.3625 Mhz clock pulses are passed through the generator 90.

Figure 13:
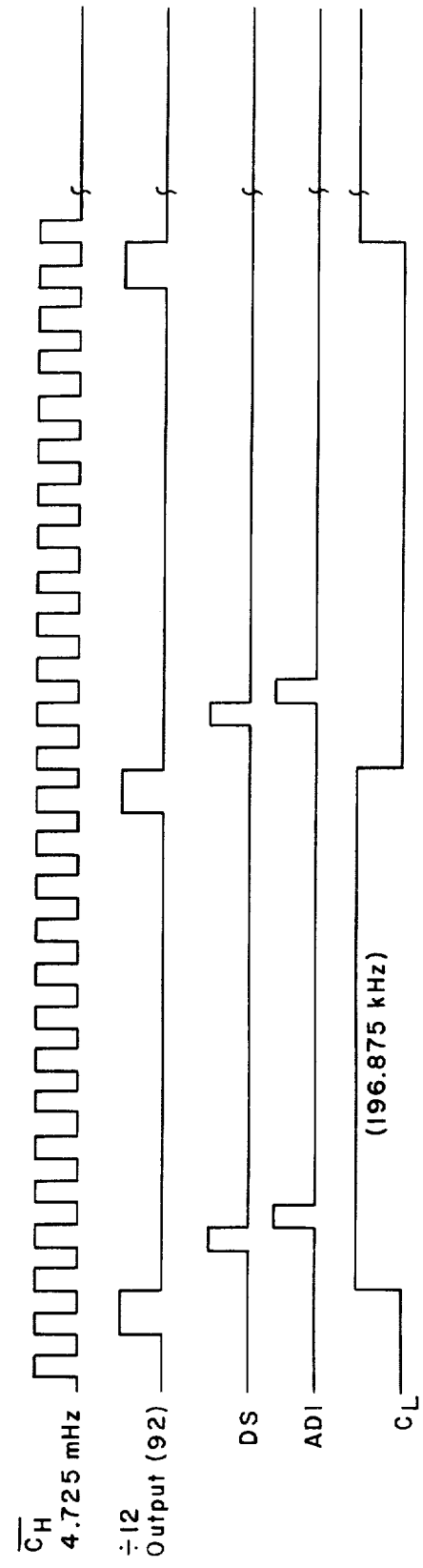

The 4.725 Mhz output pulses ($C_H$) from VCO 78 are processed by divider units 92, 94, 96, by decoder unit 98 and by IR line decoder unit 100 to produce the analog-to-digital initiate (ADI) signal; the data shift (DS) signal; the load clock ($C_L$) signal and the load (L) signal, see FIGS. 9 and 13.

As mentioned previously, the ADI signal (see FIG. 13) initiates the conversion operation of analog-to-digital convertors 48; and the DS signal has a sampling interval equal to the IR sampling time and precedes the ADI signal by about 106 nonoseconds (one-half clock pulse). As shown in FIG. 9, the L pulse defines the central 650.24 microsecond interval of the data loading period. The logic control signal A is provided by elements 102 and 104 (FIG. 7) from the applied IRHS signal and element 104 is reset by the master reset signal from one shot 82. As shown in FIG. 9 the A control signal is true during every other IR horizontal scan period.

The clock pulses $CP_A$ and $CP_B$ for memory sections 50 and 52, respectively, are produced by shift register clock generator 106 in accordance with the logic equations shown on FIG. 7 below generator 106. It is noted that the memory sections 50 and 52 are internally clocked at twice the rate of the clocking pulses applied thereto, so that the loading ($C_L$) and recirculation ($C_R$) rates of the composite clock pulses are 196.875 khz and 2.3625 Mhz respectively, i.e. the rate of the applied composite clock pulses is one-half of the IR data loading rate and one-half of the TV format readout rate.

Figure 12:
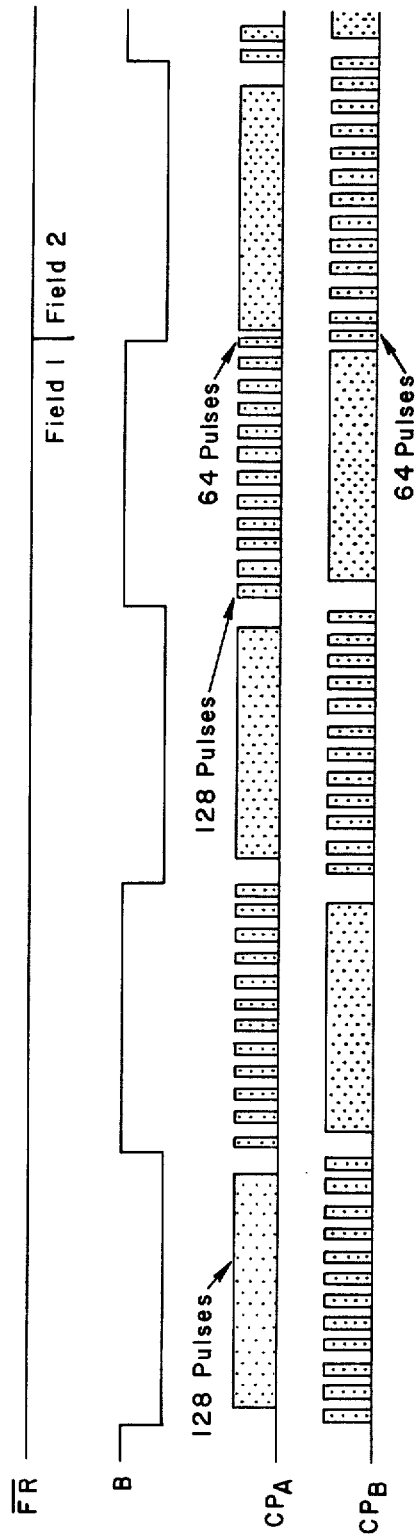

As shown in the center right-hand portion of FIG. 7, divider units 108 and 110 respond to the signal F from divider 80 to produce the B (see FIG. 12) and the B signals which control the input multiplexers of memory sections 50 and 52. Also unit 108 produces control signals $M_1$, $M_2$, $M_3$ and $M_4$ which control the operation of the output decoders of the memory sections. Dividers 108 and 110 are reset by the field reset signal produced by one shot 83.

Figure 14:
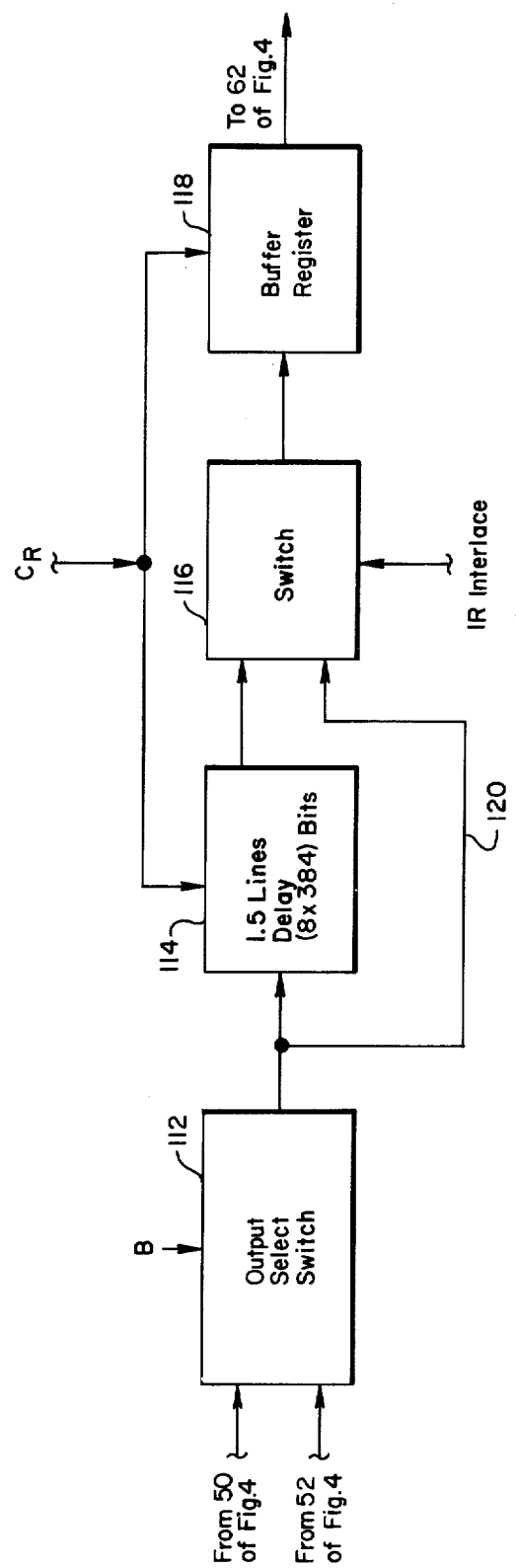
FIG. 14 is a block diagram of the output control unit shown in FIG. 4.

Output control unit 60 is shown in greater detail in FIG. 14 as comprising an output selected switch 112, a 1.5 line delay 114, a switch 116 and a buffer register 118. The output signals from memory section 50 and 52 are selectively coupled through switch 112, in accordance with the format of FIG. 6, under the control of the signal B (see FIG. 11). Due to the fact that in the embodiment of FIG. 11, the change from field 1 to field 2 occurs 1.5 TV lines before the end of the last recirculate interval in order to obtain coherent output data a 1.5 line delay is added to the data during field 2. As shown in FIG. 14 this delay arrangement consists of an 8 by 364 bits shift register which is synchronized by the signal $C_R$. The delayed signal at the output of unit 114 as well as the undelayed signal applied along path 120 are fed to switch 116 which is controlled by the IR interlace signal (see FIGS. 7 and 16). During the first field of each frame undelayed data from path 120 is coupled through 116 to output buffer register 118 and during the second field of each frame delayed data from unit 114 is presented to the buffer register.

Figure 15:
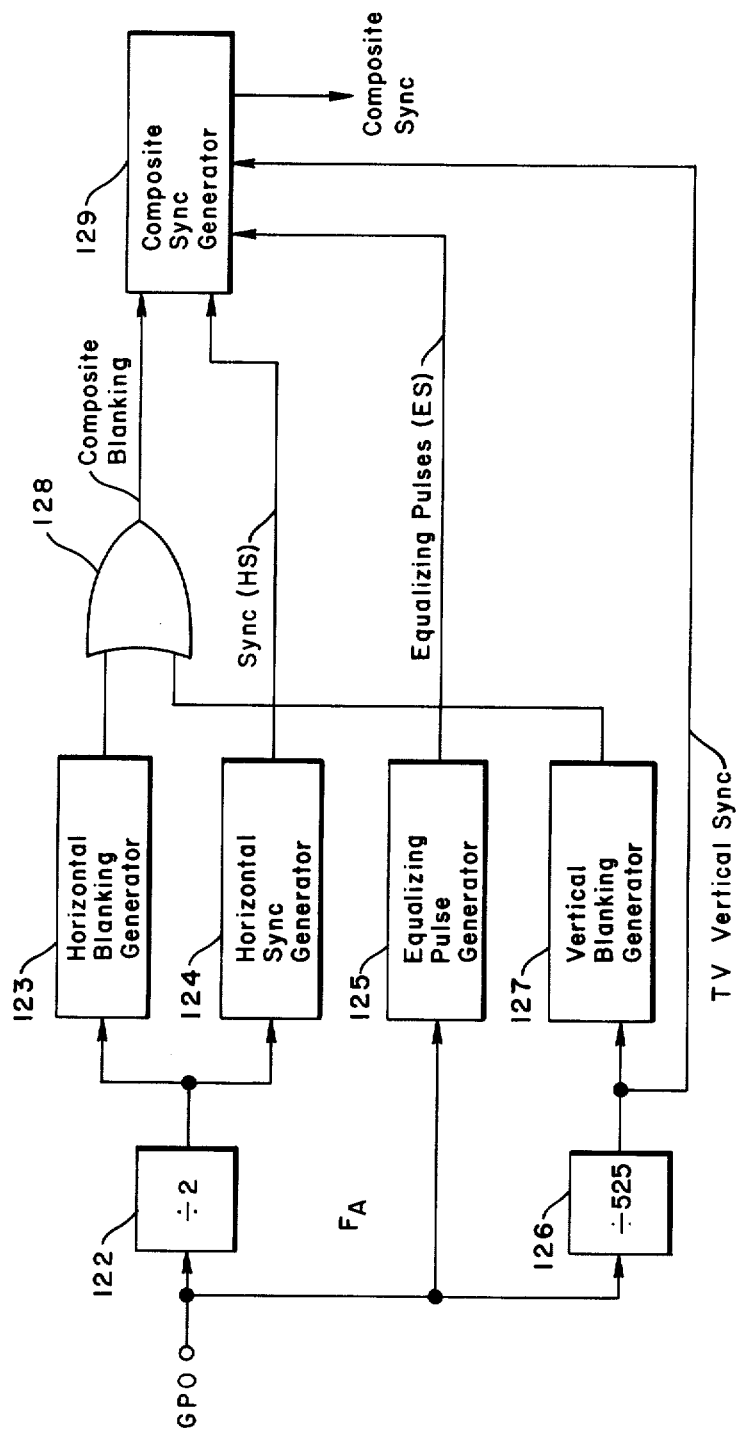
FIG. 15 is a block diagram of the blanking and sync generator shown in FIG. 4.
Figure 16:
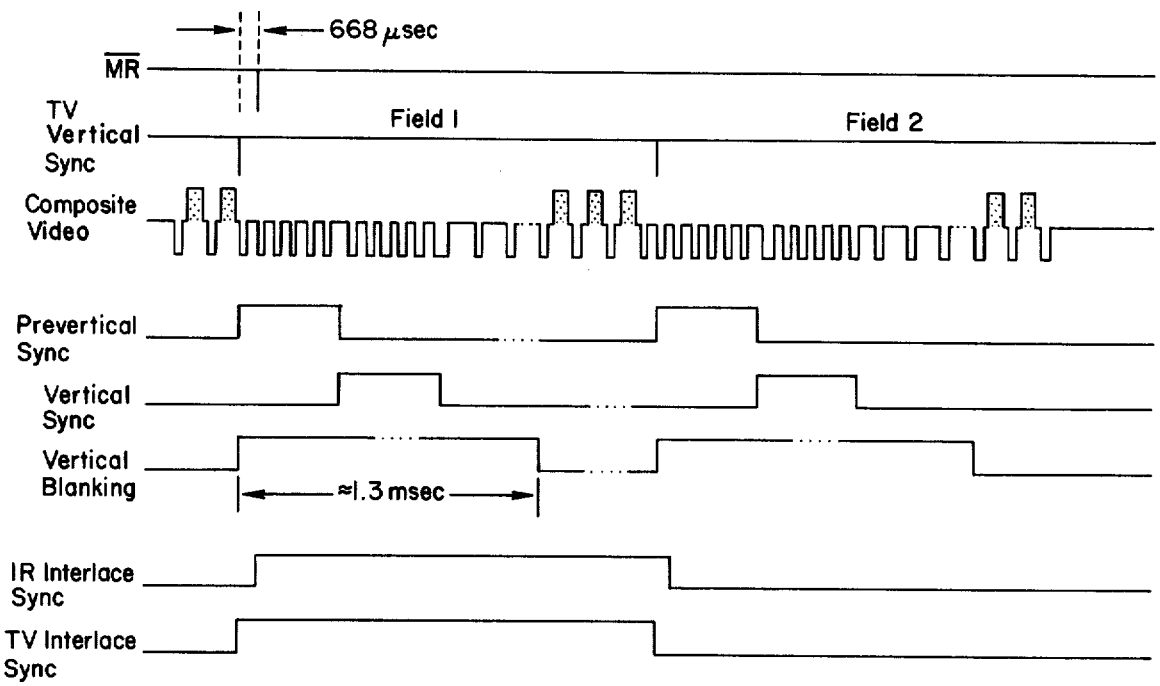
FIGS. 16 and 17 are waveforms of signal amplitude versus time which are useful in understanding the operation of the blanking and sync generator of FIG. 15.
Figure 17:
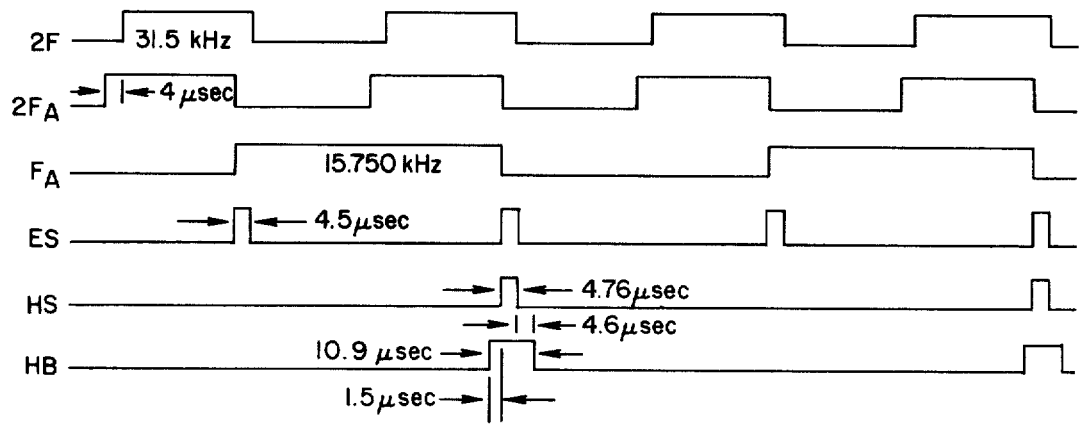

Blanking and sync generators 64 of FIG. 4 is shown in greater detail in FIG. 15 to which reference is now directed in conjunction with FIGS. 16 and 17 which depict the waveforms of the various signals produced by the units of FIG. 15. The GPO signal (see FIG. 10) is counted down by a factor of 2 within a divider 122 (FIG. 15) and the output signal therefrom is used to synchronize a horizontal blanking generator 123 and a horizontal sync generator 124. The GPO signal is also used to synchronize an equalizing pulse generator 125; and the GPO signal after being counted down by a factor of 525 within divider 126 is used to synchronize a vertical blanking generator 127. The output signal from the divider 126 is also used as the TV vertical sync signal. The blanking pulses from the horizontal blanking generator 123 and vertical blanking generator 127 are combined in an OR gate 128; and the output signal therefrom along with the horizontal sync pulses, the equalizing pulses and the TV vertical sync pulses are combined within composite sync generator 129 to form the composite sync signal at the output thereof. The composite sync signal is combined within adder 66 (FIG. 4) with the video signal from the digital-to-analog convertor 62 to form the composite video at the output of adder 66.

Figure 18:
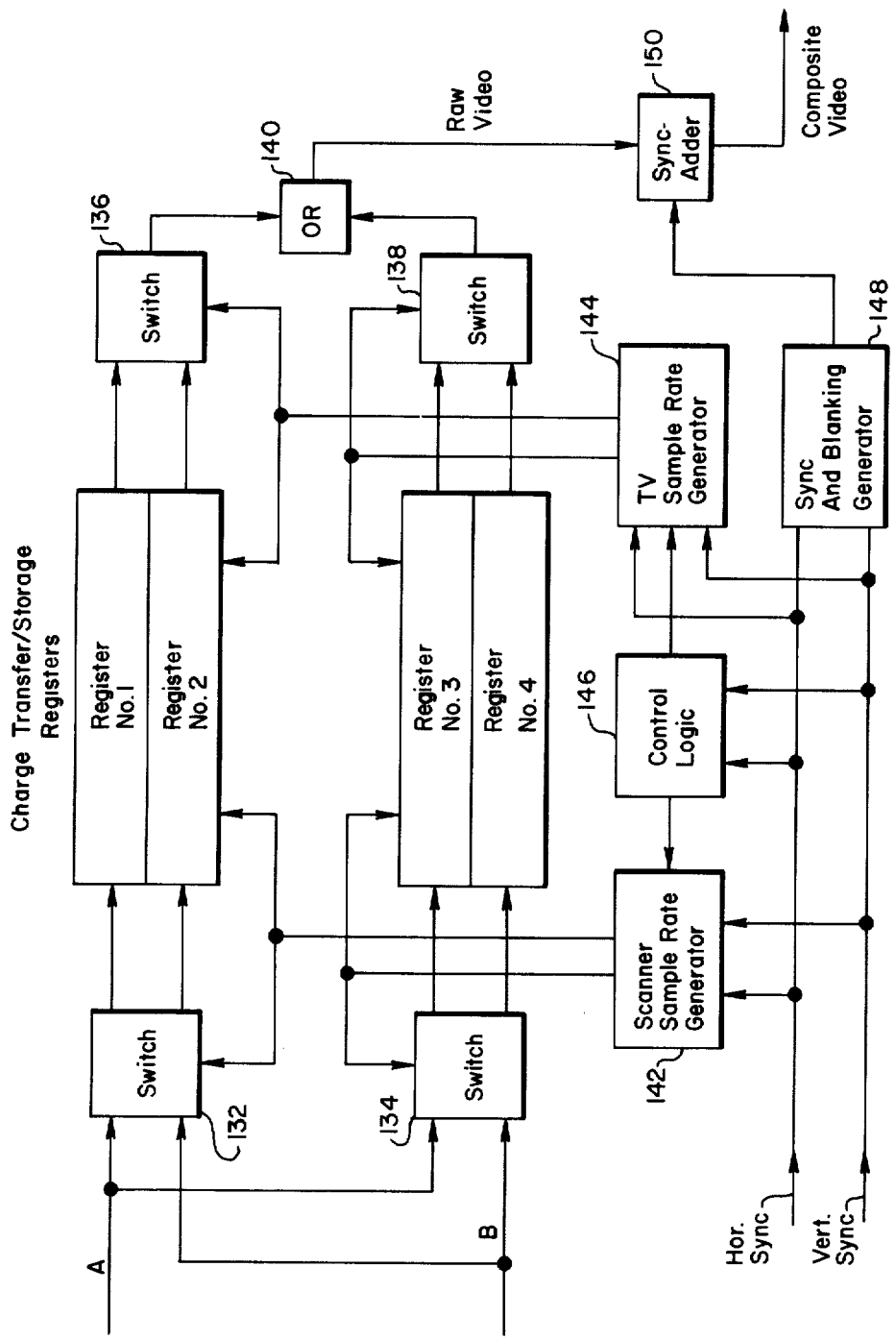
FIG. 18 is a block diagram of another embodiment of a scan convertor in accordance with the subject invention wherein charge transfer/storage registers are utilized.

An embodiment of the subject invention which is adaptable to implementation by solid state analog, instead of digital, techniques is shown in block diagram form in FIG. 18. For this illustrative embodiment the applied video and the output scan converted (TV line format) data are the same as that processed by the embodiment of FIG. 1 and shown in FIG. 2. However, the embodiment of FIG. 18 utilizes the "charge transfer/storage" principle for video storage and conversion. Significant cost reductions can be realized with this embodiment inasmuch as analog-to-digital and digital-to-analog conversions are not required. Also, the circuitry required to store each video element is less when using the analog approach of FIG. 18 because the "charge transfer/storage" circuitry requires only two transistors and two capacitors per video elements, and these components may be implemented with either discrete or integrated circuits. By way of contrast, the digital approach could require 8 bits of storage, for example, for each video element. Compared to prior art analog conversion techniques such as light emitting diodes, vidicons, cathode ray tubes, or scan convertor tubes, for example, the embodiment of FIG. 18 offers increased reliability, smaller size, lower weight and in many cases lower cost.

In the embodiment of FIG. 18, dual channel parallel applied data is selectably loaded into one set of charge transfer/storage registers through dual channel switches 132 or 134; while the other set of registers are read out through dual channel switches 136 or 138 and OR gate 140. The loading operation is controlled and synchronized by scanner sample rate generator 142; and the read out operation is controlled and synchronized by TV sample rate generator 144. Both generators 142 and 146 are controlled in response to signals provided by a control logic unit 146. A generator 148 provides horizontal and vertical sync pulses, as well as video blanking pulses, to a sync adder 150 wherein the output video applied through OR gate 140 is summed with the output signals from generator 148 to form the composite output video.

The timing of the loading and readout operation of the scan convertor of FIG. 18 is as shown in FIGS. 2 and 3 and as discussed hereinabove relative to the embodiment of FIG. 1. The implementation of the specific gating signals and sampling signals for the four switches and the charge transfer/storage registers will be obvious to those skilled in the art in view of the similar timing and gating functions discussed in detail hereinabove relative to the embodiment of FIG. 4.

In the operation of the scan convertor of FIG. 18, at the beginning of the field 1 the scanner (not shown) generates video lines $A_1$ and $B_1$; and control logic unit 146 connects the scanner sample rate generator 142 to switch A and to registers number 1 and 2. Video line $A_1$ is sampled and fed into register number 1; and video line $B_1$ is sampled and fed into register number 2, with these last two operations occurring in parallel. As each of the samples (one video element of a line of video) is stored in a register, previously stored video elements are shifted "down the line" one element.

The charge transfer/storage registers may be formed from a cascade of capacitors interconnected by switches operating at the frequency of either the scanner sample rate generator or the TV sample rate generator. It is noted that the scanner sample rate would correspond to the rate of the load clock pulses $C_L$ of the embodiment of FIG. 4, while the TV sample rate signals would correspond to the rate of the recirculate clock pulses $C_R$. In charge transfer/storage registers, since a new video element cannot be stored in a capacitor before the video element present therein is completely removed, only half the number of capacitors actually store video signals at any one time. For example, if it is assumed that video elements are stored in even numbered capacitors and the odd numbered capacitors are empty then the video data elements would be transferred to the adjacent odd numbered capacitor; with the odd and even numbered capacitors switches (not shown) being driven with half a sampling period phase difference. A detailed explanation of the principles and structure of charge transfer/storage devices may be found in the article "Charge-coupled Semiconductor Devices," by W. S. Boyle and G. E. Smith, published in the Bell System Technical Journal of April 1970 at pp. 587 through 593; and the article entitled "Bucket-brigade Electronics-New Possibilities for Delay, Time Axis Conversion, and Scanning," by F. L. J. Sangster and K. Teer, published in the IEEE Journal of Solid State Circuits of June 1969, volume SC4 at pp. 131 through 136.

Continuing with the explanation of the operation of the scan convertor of FIG. 18, at the beginning of the horizontal scan lines $A_3$ and $B_3$ (see FIGS. 2 and 3) the control logic unit 146 connects the scanner sample rate generator 142 to switch 134 and to registers number 3 and 4. Also during this time period TV sample rate generator 144 is connected to switch 136 and to registers number 1 and 2. Hence, video line $A_3$ is sampled and fed into register number 3 and video line $B_3$ is sampled and fed into register number 4 while the video that was previously stored in registers number 1 and 2 is read out. The readout of video in the embodiment of FIG. 18 is in a single channel, serial manner with each of the registers being read out twice at the TV sample generator rate frequency. It is noted that the second readout capability is achieved by feeding the output signal back to the input during the first readout period; and in the embodiment of FIG. 18 this capability is internal to the registers and is not shown explicitly in the figure. After the second readout of register number 1, register number 2 is read out twice at the TV sample generator frequency. During the second horizontal scan line period, therefore, the two parallel channels of video $A_3$ and $B_3$ are stored in registers number 3 and 4 while scan line $A_1$ is converted into two output TV lines and scan line $B_1$ is converted into two output TV lines. This just described process continues for all the video lines in each seeker field such that the two parallel channels of scanner video are transformed into a single channel of composite video with a four times higher horizontal line rate.

Figure 19:
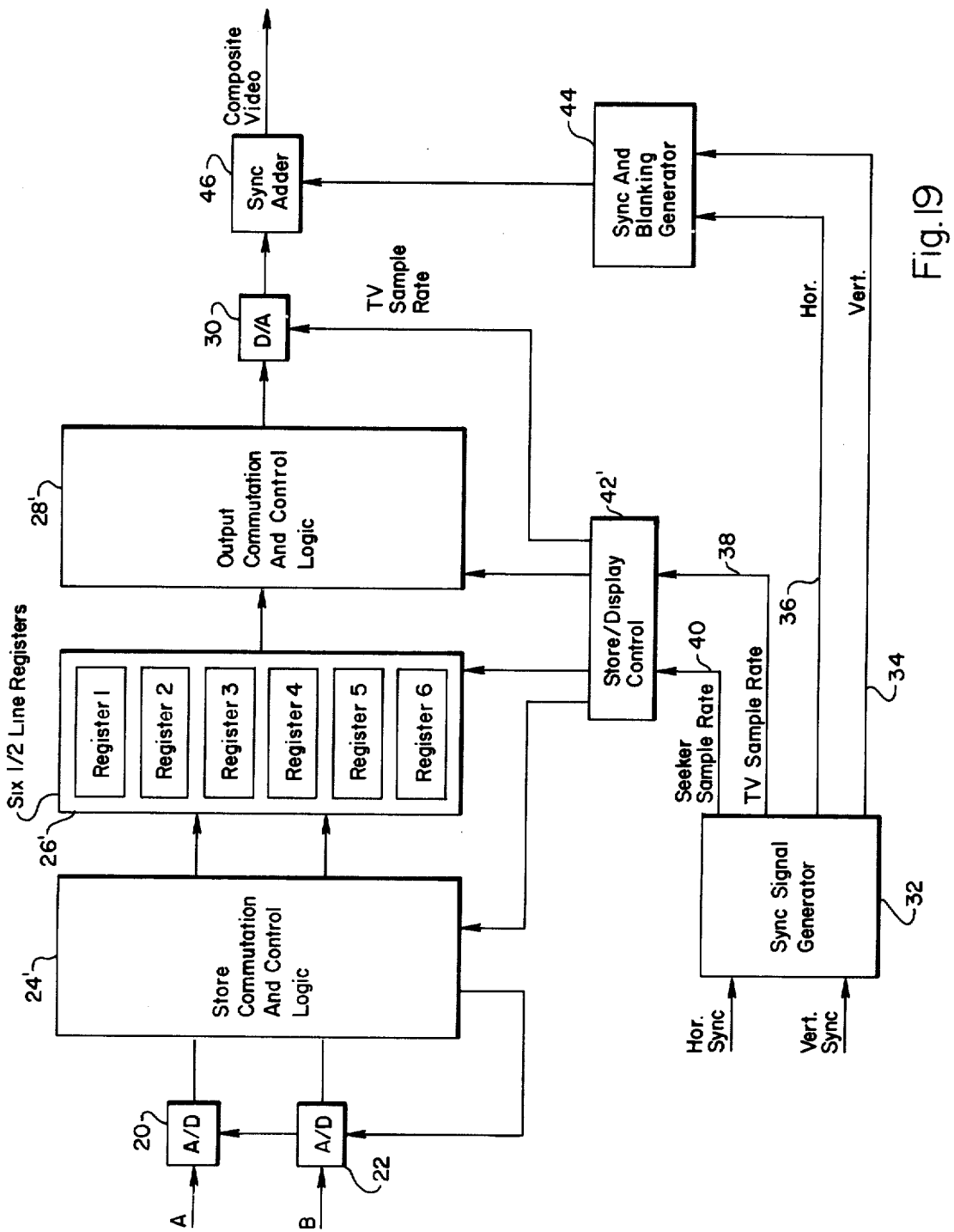
FIG. 19 is a block diagram of another embodiment of a scan convertor in accordance with the subject invention in which fractional video lines storage per register is implemented.

FIG. 19 illustrates yet another embodiment of the subject invention in which the length of data storage per register and the method of commutating signals into and out of the storage registers is different than the previously described embodiments. For example, in the embodiment of FIG. 1 each storage register of memory 26 has the capacity for a full line of storage, whereas in the embodiment of FIG. 19 each storage register of memory unit 26' has the capacity of only one-half line of storage and six such half line storage registers are utilized.

Figure 20:
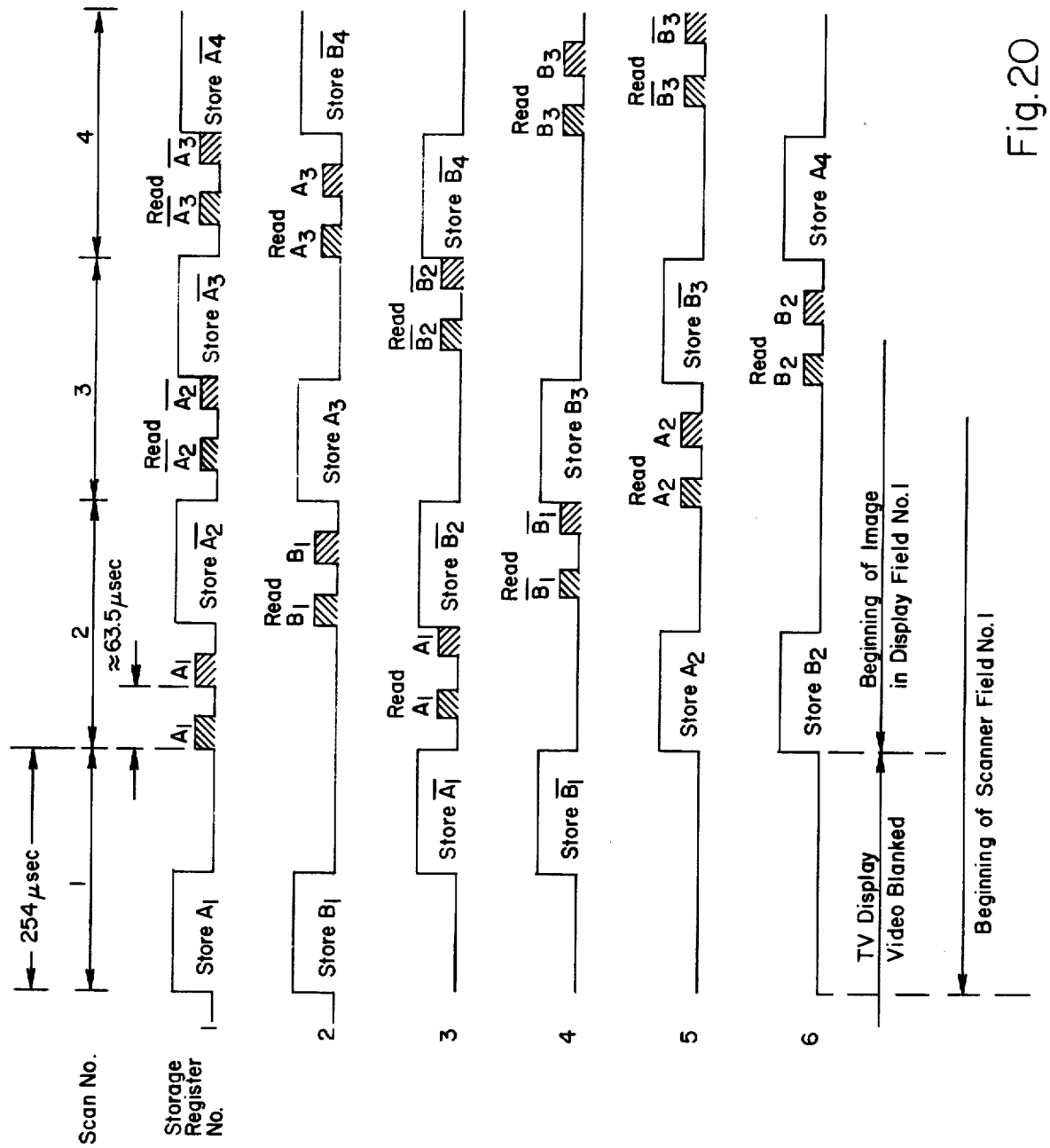
FIG. 20 is a timing diagram for the scan convertor of FIG. 19.

In the embodiment of FIG. 19, the data applied to the scan convertor and the output data therefrom are the same as depicted in FIG. 2 and discussed hereinabove relative to the embodiment of FIG. 1. Also the operation of the elements shown in FIG. 19 are the same or similar to the corresponding elements discussed hereinabove relative to FIG. 1, except for the modifications required due to the changes in storage and readout timing noted hereinafter and illustrated in the timing diagram shown in FIG. 20. The terminology adapted with respect to FIG. 20 is as follows: A denotes the video produced by the detector array A; B denotes the video provided by detector B; $A_1$ denotes the first half of the video line from detector A during horizontal scan number 1; $A_1$ denotes the second half of the video from detector A during scan number 1; $B_1$ denotes the first half of the video line from detector B during horizontal scan number 1; and $B_1$ denotes the second half of video from detector B during the scan number 1.

As shown in FIG. 19, the storage of memory section 26' is implemented by means of 6 identical storage registers with each register having the capability of storing one-half a line of input video. During the first half of horizontal scan number 1, the video from the two scan lines $A_1$ and $B_1$ (one-half lines) are stored in registers 1 and 2; and during the second half of that scan period the video from the scan lines $A_1$ and $B_1$ are stored in registers number 3 and 4. During the first half of horizontal scan period number 2, the video from the two scan lines $A_2$ and $B_2$ are stored in registers 5 and 6. During the first half of the seeker scan period number 2 scan line $A_1$ is read out of register number 1 followed by scan line $A_1$ being read out of register number 3; and then scan line video $A_1$ is read out of register number 1 a second time and scan line $A_1$ is read out of register number 3 a second time. During the second half of horizontal scan period number 2, the video from the two scan lines $A_2$ and $B_2$ is stored in registers number 1 and number 3, respectively, while at the same time scan line $B_1$ is read out of register number 2 followed by the read out of scan line $B_1$ from register number 4 and then the scan line $B_1$ is read out of register number 2 a second time followed by line $B_1$ being read out of register number 4 a second time. The above described sequence continues for subsequent horizontal scanning periods such that video is always being written into two of the storage registers while scan converted video in the TV format is read out of two different storage registers.

The embodiment of FIG. 19 has the advantage of only requiring three full lines of video storage (6 registers of one-half line storage capacity each). Also, it is noted that the embodiment of FIG. 19 is directly adaptable to implementation by the analog "charge transfer/storage" register configuration discussed hereinabove relative to the embodiment of FIG. 18. The fractional line of storage implementation is particularly advantageous for applications which utilize large scale integration type charge transfer/storage registers inasmuch as the production yield of such devices is substantially increased as the storage requirement per register is decreased. Also by reducing the number of times a given sample of data must be transferred (shorter register lengths) the fractional line storage feature allows the use of charge transfer/storage devices having a lower "transfer efficiency" and/or improves the processing signal-to-noise ratio.

It is noted that the reduction in the total amount of storage resulting from the embodiment of FIG. 19 is counterbalanced to a certain extent by the increase in the complexity of the circuits required to implement the input 27 and output commutation of the data from memory unit 26'. However, the above noted advantages of circuit yield and processing efficiency provided by fractional line storage may be realized with only a slight increase in complexity of the commutation circuitry if the reduction in the total storage requirement provided by the embodiment of FIG. 19 is sacrificed. For example, in the embodiment of FIG. 18 each of the registers could be implemented by two (or more) fractional line registers with standard multiplexing techniques being employed so that the fraction line registers function identically to a single full line register. In such an implementation the first part of a line of scanner data would be serially loaded into the first fractional line register and then the second portion of the line of data into the second fractional line register. During readout the two fractional line registers would be sequentially scanned.

Although numerous embodiments of the subject invention have been described hereinabove, it is understood that many variations thereto may be made within the scope of the subject invention. For example, in applications having substantial "dead time" between horizontal scan periods the data commutation arrangement may be modified such that half (or a preselected percentage of) the storage registers function to receive scanner data and the other registers are utilized to readout the data; with data transfer between the receive and readout registers accomplished during the horizontal scan dead time. In the system of FIG. 1, channel A and B data would be loaded into registers 1 and 3, respectively, during the scan time and would be transferred to registers 2 and 4, respectively, (either in parallel or serially), during the horizontal dead time. During the next horizontal scan time registers 1 and 3 would be loaded with new data while the data from the previous scan period is read out of registers 2 and 4 in accordance with the display format of FIG. 2.

Another example of variations in the data commutation approach could comprise a combination of the various techniques discussed hereinabove. One such implementation relative to the embodiment of FIG. 1 could include storing channel A and B scanner data in registers 1 and 2, respectively, during the active horizontal scan time. During the horizontal dead time the data from register 1 is read out the preselected number of times and the data from register 2 is transferred to register 3. During the following horizontal scan time the next line of channel A and B data is stored in register 1 and 2, respectively, while register 3 is read out the preselected number of times. In this just described implementation the fourth register shown in FIG. 1 is not required inasmuch as the low scan efficiency (lengthy dead time period) allows sufficient storage with registers 1 through 3.

Another variation of the invention would be to implement the memory readout control logic unit such that parallel channel output data is provided. Parallel channel output data could be desirable for applications such as multiple elctron gun cathode ray tubes or parallel channel liquid crystal display units, for example. Such a parallel output channel configuration for the system of FIG. 1 would have registers 1 and 2 read out in parallel on alternate processing periods and registers 3 and 4 readout in parallel on the other processing periods.

Hence, the subject invention may be implemented for transforming applied data into output data having a preselected time base and number of output channels.

The memory sections may be implemented such that registers are loaded with data during one processing period and read out during the following processing period; or with one set of registers functioning to receive data and a second set of registers being used for data readout, with series or parallel transfer of data between the receive and readout registers; or with a combination of the just listed register configurations.

Other variations of the subject invention could include changes to any of the following parameters or features: field and frame rates input video and the scan converted output video; the number of input channels; the number of output channels; the number of storage registers; the length of storage per sub-register (fractional to full line or greater); commutating the input data into the storage registers; input versus output speed of the storage registers; the type of storage (e.g. analog, digital, magnetic); the type of input data, e.g. TV (black and white, or color); IR or radar; the number of output lines identical to the number of input lines; the rate of the output data the same as the rate of the input data; or combinations of the above.

Thus having described a new and improved method and apparatus for transforming the format of applied data, what is claimed is:

1. The method of transforming first data groups each comprising sequentially applied set of lines of parallel channel data having a first time base, into second data groups each of which contains the same information content as the corresponding first data group and is comprised of lines of single channel data having a second time base which is different from said first time base, said method comprising the steps of:

storing alternate sets of lines of parallel channel data of the first data group in alternate ones of a pair of memory sections such that different ones of said pair of memory sections are loaded with data during alternate processing periods; and sequentially reading out a preselected plurality of times and at said second time base each of the lines of data of the set stored during the last preceding processing period;

whereby the data read from said memory sections forms said second data group.

2. The method of transforming first data groups each comprising sequentially produced sets of lines of parallel channel data having a first time base, into second data groups each comprising lines of single channel data having a second time base, said method comprising the steps of:

storing the first set of lines of parallel channel data of a first data group in a first memory section;

storing the second set of lines of parallel channel data of said first data group in a second memory section, while reading out a preselected number of times and at said second time base each of the lines of data of said first set from said first memory section;

storing the third set of lines of parallel channel data of said first data group in said first memory section in place of said first set, while reading out said preselected number of times and at said second time base each of the lines of data of said second set from said second memory section;

storing the fourth applied set of lines of parallel channel data of said first data group in said second memory section in place of said second set, while reading out said preselected number of times and at said second time base each of the lines of data of said third set from said first memory section;

repeating the storage and readout procedure of the last two above listed steps for the remaining data of the first data groups such that every other set of lines of parallel channel data is processed by opposite ones of said memory sections;

whereby the data readout of said first and second memory sections forms said second data groups.

3. The method of claim 2 wherein said preselected number of readout times is a preselected integer number of times which is greater than one, whereby the number of lines in each of said second data groups exceeds the number of lines in the corresponding first data group.

4. The method of transforming first data groups each comprising sequentially produced sets of lines of parallel channel data having a first time base, into second data groups each comprising lines of single channel data having a second time base, said method comprising the steps of:

storing a first portion of each line of one set of said first data group in preselected ones of a group of data storage devices;

storing the remaining portion of each line of said set of parallel channel data of the first data group into other preselected ones of said group of data storage devices;

reading out the data from said storage devices such that the first portion and the remaining portion of each stored data line are contiguously read out a preselected number of times at said second data rate; and repeating the above storing and readout steps for subsequent sets of parallel channel data such that new data is stored in said data storage devices following the readout of data therefrom and subsequent sets of parallel channel data are stored in some of said data storage devices while previously stored data is readout of other storage devices;

whereby the data read from said data storage devices forms said second data group.

5. A system of transforming first data groups each comprising sequentially applied set of lines of parallel channel imaging type data into second data groups each of which contain the same information content as the corresponding first data group and is comprised of lines of single channel display type data, said system comprising:

a plurality of data storage devices;

means for storing the applied parallel channel data a set at a time in preselected ones of said plurality of data storage devices; and means for sequentially reading out each of the lines of data of the set stored during the last preceding period a preselected number of times;

whereby the data read from said data storage devices forms said second data groups.

6. The system of claim 5 wherein said data storage devices comprise digital shift register with each of said shift registers having the capacity for storing one line of said parallel channel data; said means for storing includes means for loading each data line of each set into a separate shift register; and said means for reading out includes means for sequentially reading out said shift registers said preselected number of times.

7. The system of claim 5 wherein said data storage devices comprise charge transfer/storage registers.

8. The system of claim 5 wherein said data storage devices comprise charge transfer/storage registers; and said means for storing includes means for loading each data line of a given set of said parallel channel data in a separate one of said charge transfer/storage registers at a first time base; and said means for reading includes means for reading out said charge transfer/storage registers at a second time base rate.

9. A system of transforming first data groups each comprising sequentially applied sets of lines of parallel channel data having a first time base into second data groups each comprising lines of single channel data having a second time base, said system comprising:

a pair of memory sections;

means for storing alternate sets of lines of parallel channel data of the first data group in alternate ones of said memory sections such that alternate ones of said memory sections are loaded with data during alternate processing time periods; and means for sequentially reading out a preselected number of times at the second time base rate each of the lines of data of the set stored in the memory section not loaded with data during the current processing time period;

whereby the data read out from said first and second memory section forms said second data group.

10. The system of claim 9 wherein said memory sections each comprise a plurality of digital shift registers with each of said shift registers having the capacity for storing one line of said parallel channel data; said means for storing including means for loading at said first time base rate a different line of said parallel channel data into each of said shift registers of one memory section; and said means for reading includes means for sequentially reading out each of the shift registers of the other memory section said preselected number of times at the second time base.

11. The system of claim 9 wherein said memory sections each comprise a plurality of charge transfer/storage registers; and said means for storing includes means for loading at said first time base rate a different line of said parallel channel data into each of said shift registers of one memory section; and said means for reading includes means for reading out the shift registers of the other memory section said preselected number of times at the second time base.

12. The method of transforming first data groups each comprising sequentially applied sets of lines of parallel channel data into second data groups having a different data format, said method comprising the steps of:

storing the applied parallel channel data a set at a time in preselected ones of a plurality of memory devices such that some of the lines from alternate sets are stored in alternate ones of first and second memory sections and the remaining lines of each set are stored in a third memory section; and reading out each of the lines of the stored data in accordance with said different data format such that said third memory section is read out during the time between the application of sets of data of said first data group, and said first and second memory sections are read out such that the data of the set stored during the preceding processing period is read out during the current processing period;

whereby the data read from said memory devices forms said second data groups.

* * * * *